(12) United States Patent
Zadka et al.

(10) Patent No.: US 9,411,619 B2
(45) Date of Patent: Aug. 9, 2016

(54) PERFORMANCE MANAGEMENT OF SYSTEM OBJECTS BASED ON CONSEQUENCE PROBABILITIES

(75) Inventors: Moshe Zadka, Foster City, CA (US); Shankar Unni, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 188 days.

(21) Appl. No.: 13/415,658

(22) Filed: Mar. 8, 2012

(65) Prior Publication Data

US 2013/0239107 A1 Sep. 12, 2013

(51) Int. Cl.
G06F 9/455 (2006.01)

(52) U.S. Cl.
CPC ............ *G06F 9/455* (2013.01); *G06F 9/45558* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 6,233,570 B1 | 5/2001 | Horvitz et al. | |
| 8,495,648 B1* | 7/2013 | Brandwine et al. | 718/104 |
| 2008/0256533 A1* | 10/2008 | Ben-Yehuda et al. | 718/1 |
| 2009/0064156 A1* | 3/2009 | He et al. | 718/104 |
| 2009/0204234 A1 | 8/2009 | Sustaeta et al. | |
| 2009/0300173 A1* | 12/2009 | Bakman et al. | 709/224 |
| 2010/0100877 A1* | 4/2010 | Greene | G06F 9/5011 718/1 |

* cited by examiner

*Primary Examiner* — Lewis A Bullock, Jr.
*Assistant Examiner* — Wynuel Aquino

(57) ABSTRACT

Embodiments provide a system including a plurality of objects and a monitoring module coupled to the objects. The monitoring module is configured to determine a health value of each object. The system also includes an optimization module coupled to the monitoring module. The optimization module is configured to receive a user input indicating a utility to be increased within the system, wherein the utility is based on the health value of each object. The optimization module is also configured to identify a plurality of available actions to be performed on each object. Each available action is associated with at least one expected consequence. The optimization module is also configured to calculate an expected utility of each action based on an effect of each expected consequence on the health value of each object and select, from the available actions, an action based on the expected utility for the system.

19 Claims, 5 Drawing Sheets

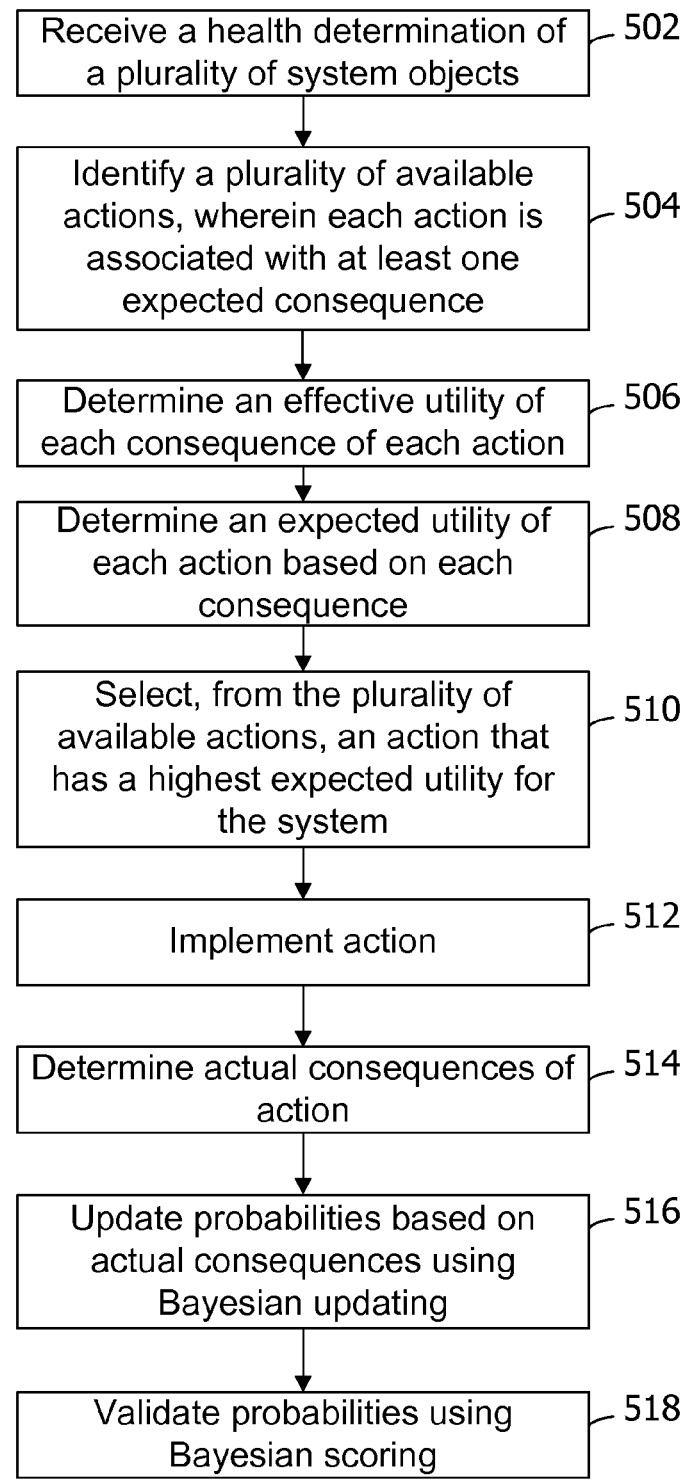

PERFORMANCE MANAGEMENT OF SYSTEM OBJECTS BASED ON CONSEQUENCE PROBABILITIES

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

A system, such as a datacenter, may include a plurality of VMs or other applications or objects. During operation of the system, the objects may experience performance degradation. For example, one or more objects may become nonfunctional if the object or a host that the object is executing on becomes unresponsive or "locked up." In addition, objects may experience performance degradation if resources used by the objects are constrained. Such performance degradation may cause the system to operate unsatisfactorily and/or may require maintenance to be performed to correct the performance degradation. Moreover, objects within the system may be at least partially dependent on one another such that an action implemented on one object may affect a performance of one or more other objects.

Due to the complexity of such systems, the causes of such performance degradation may be difficult to determine. Some systems include agents that enable the automatic correction, or "self-healing," of certain object performance degradation issues. However, such systems may only address the performance degradation of an individual object, rather than determining one or more actions to maximize a performance of the system as a whole. In addition, such systems or agents may not be able to determine which actions actually improve the performance of the objects or system, and which actions have no effect or have a negative effect on the system performance.

SUMMARY

An optimization module is described herein for facilitating optimum or maximum utility of a system. The optimization module receives health determinations for a plurality of objects in the system from a monitoring module. A plurality of available actions is identified, and each action is associated with at least one expected consequence. The optimization module determines an effective utility of each consequence of each action, and determines an expected utility of each action based on the effective utility of each consequence. An action is selected from the available actions based on the expected utility of the system. The selected action is implemented within the system by the monitoring module. When the selected action has been implemented, the actual consequences of the action are determined by the monitoring module. One or more expected probabilities are updated, using a Bayesian updating function, based on the actual consequences. In addition, one or more probabilities are validated using Bayesian scoring.

This summary introduces a selection of concepts that are described in more detail below. This summary is not intended to identify essential features, nor to limit in any way the scope of the claimed subject matter.

BRIEF DESCRIPTION OF THE DRAWINGS

FIG. 5 is a flowchart of an exemplary method for optimizing a utility of a system.

DETAILED DESCRIPTION

Embodiments described herein include an optimization module for facilitating optimizing or maximizing a utility of a system. The optimization module receives user inputs that set the desired utility of the system to be a maximized net health of the objects within the system. In some embodiments, the term "utility" refers to a measure of desired system or object performance. The user inputs also identify a relative importance of each object, and may additionally include a list of available actions, a list of consequences associated with the available actions, and/or an initial set of expected probabilities of the occurrence of each consequence. The optimization module also receives health determinations for the objects in the system from a monitoring module. A plurality of available actions is identified, and each action is associated with at least one expected consequence.

The optimization module determines an effective utility of each consequence of each action, and determines an expected utility of each action based on the effective utility of each consequence. In some embodiments, an action that has a highest expected utility for the system is selected from the available actions. The selected action is implemented within the system by the monitoring module. When the selected action has been implemented, the actual consequences of the action are determined by the monitoring module. One or more expected probabilities are updated based on the actual consequences using a Bayesian updating function. In addition, one or more probabilities are validated using Bayesian scoring.

Accordingly, the optimization module described herein enables a utility of a system of objects to be maximized or increased. More specifically, the optimization module identifies the action or actions that maximize the net utility for a plurality of objects within the system, rather than just focusing on the utility of an individual object. In addition, the actual effect of the implemented action is monitored and is used to improve or update the probabilities used to select a future optimal action. Accordingly, the optimization module is a self-learning module that improves a confidence in expected probabilities of consequences occurring over time. The optimization module therefore provides a more robust and accurate prediction of the optimal action to implement to maximize the utility of the system over time.

Figure 1:
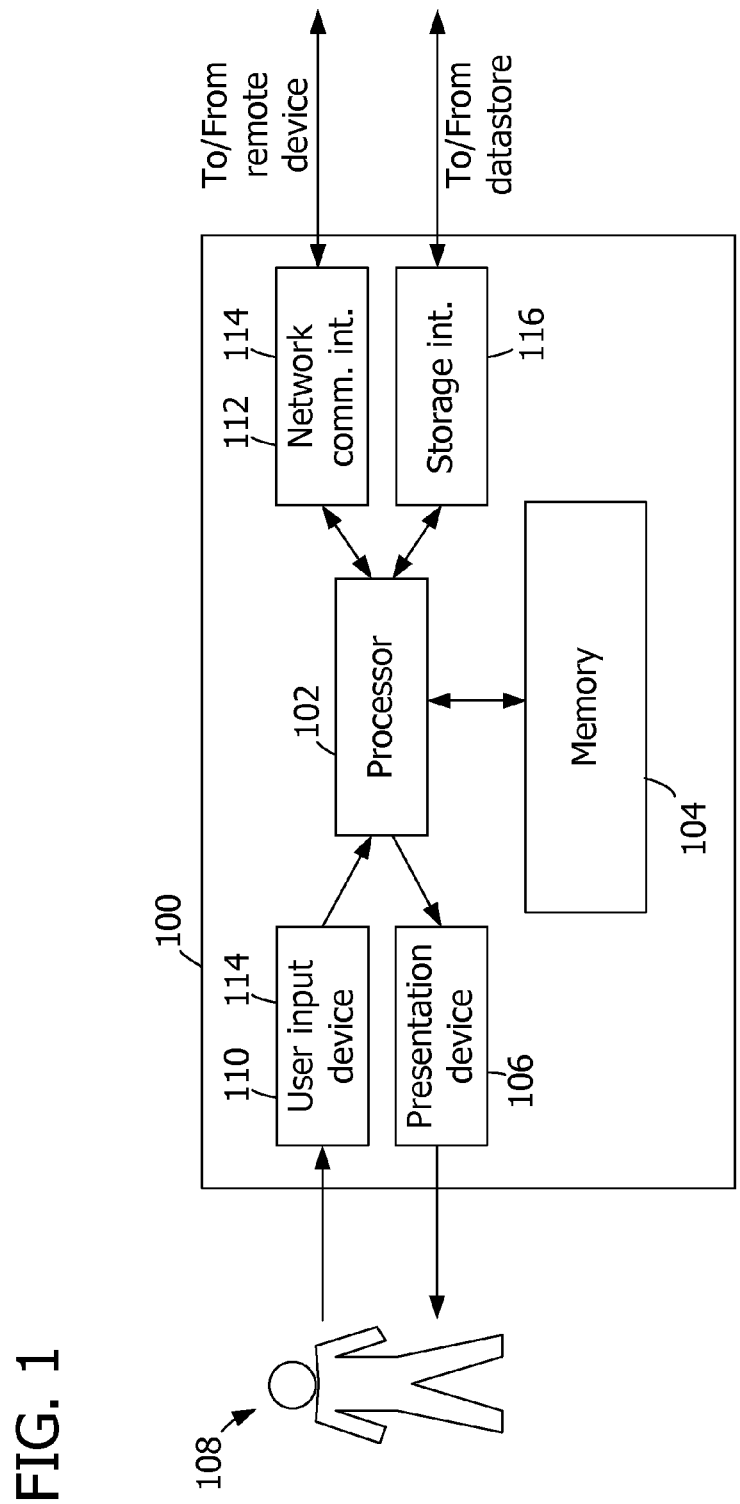
FIG. 1 is a block diagram of an exemplary computing device.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
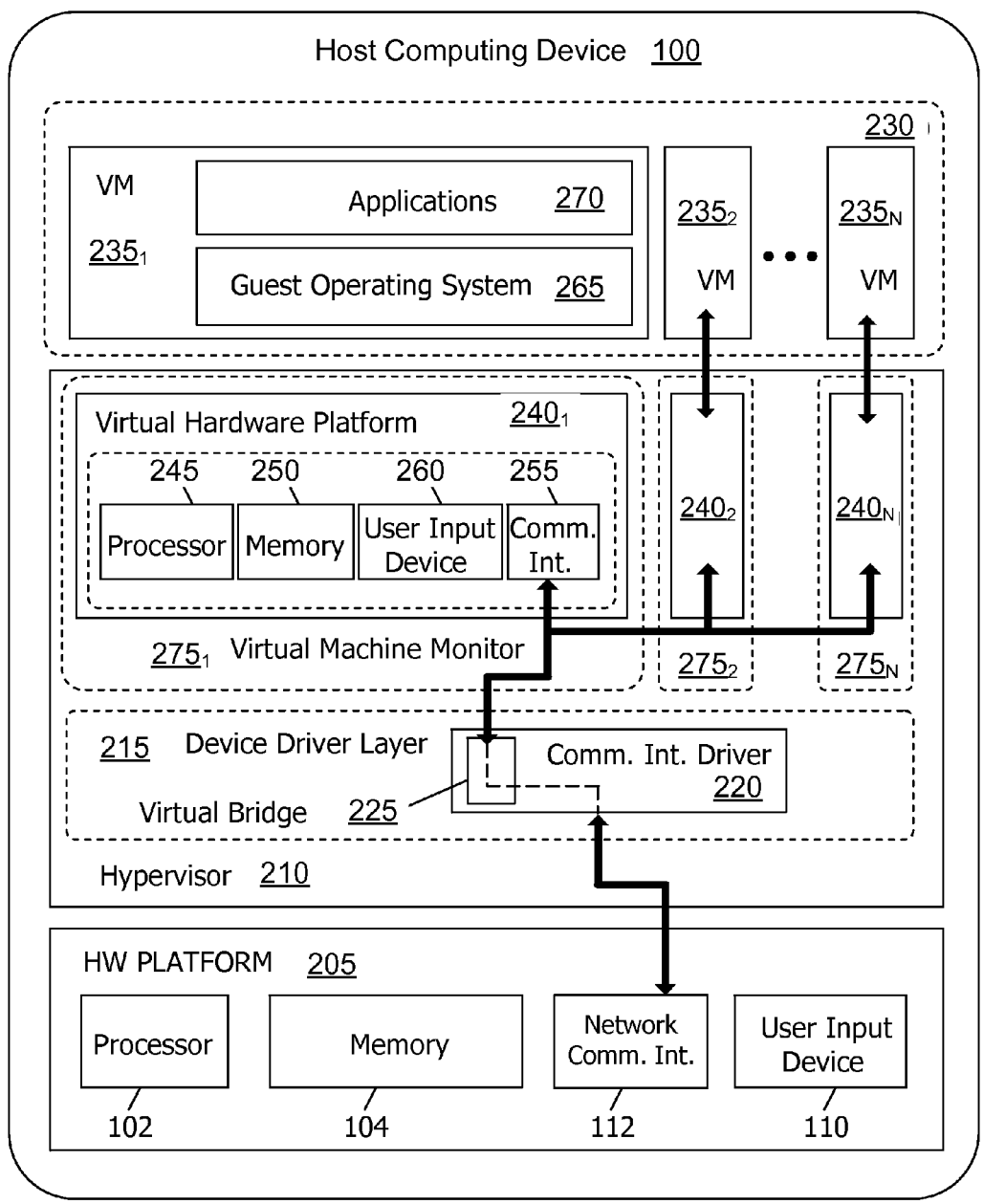
FIG. 2 is a block diagram of virtual machines that are instantiated on a computing device, such as the computing device shown in FIG. 1.

FIG. 2 depicts a block diagram of virtual machines $235_1$, $235_2$ ... $235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each virtual hardware platform includes its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
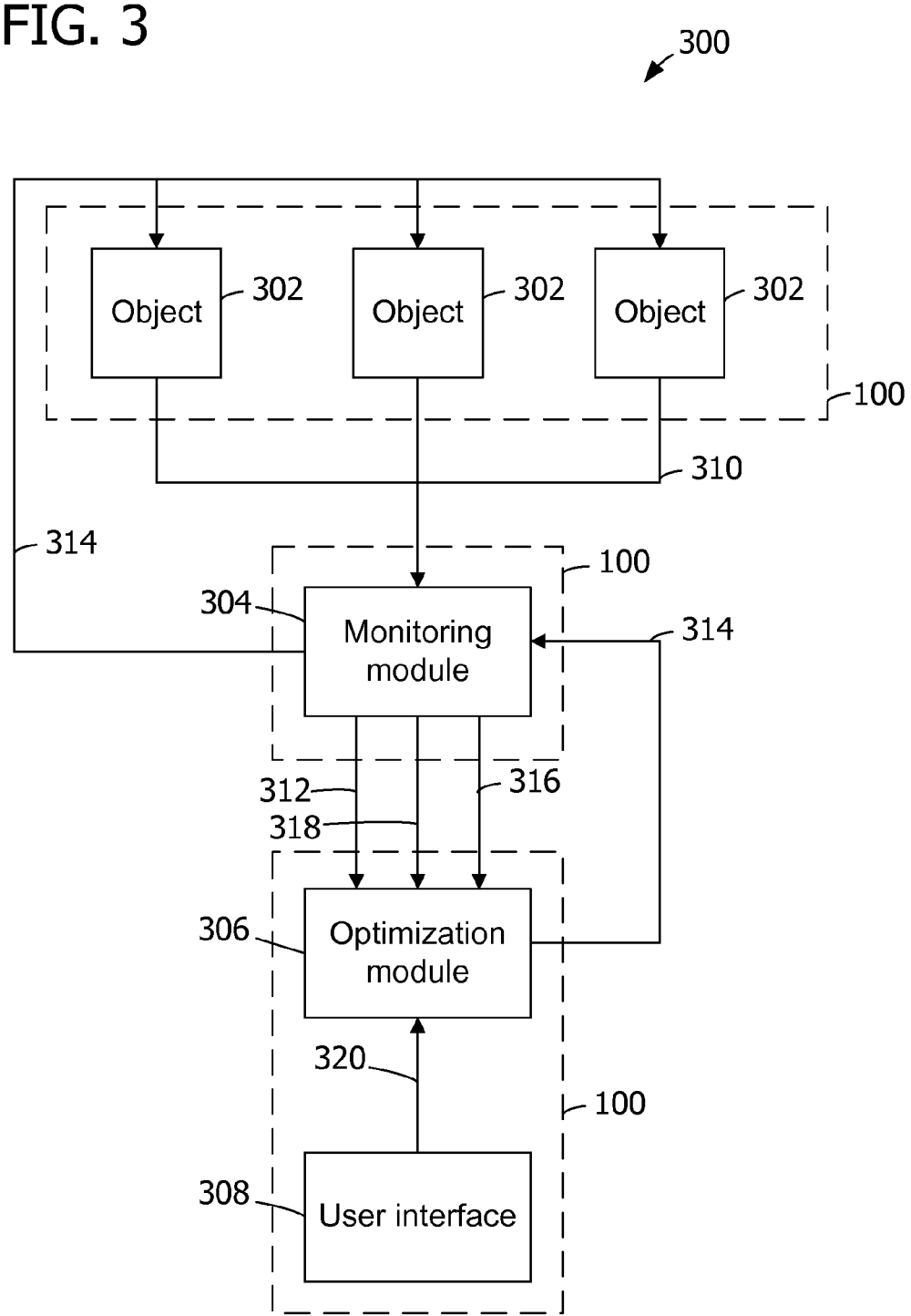
FIG. 3 is a block diagram of an exemplary system including a plurality of computing objects.
Figure 4:
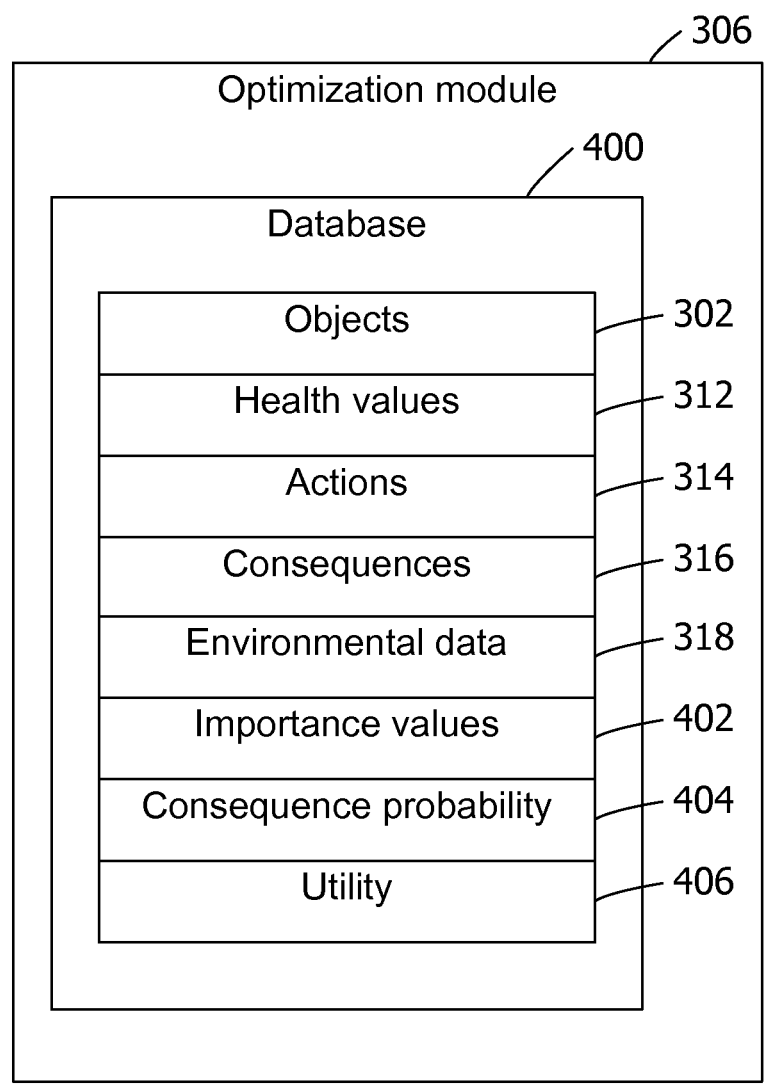
FIG. 4 is a block diagram of an exemplary optimization module that may be used with the system shown in FIG. 3.

FIG. 3 is a block diagram of an exemplary system 300 that includes a plurality of computing objects 302, a monitoring module 304, an optimization module 306, and a user interface 308. FIG. 4 is a block diagram of an exemplary optimization module 306 that may be used with system 300. In one embodiment, system 300 is a datacenter 300. Alternatively, system 300 may be any other suitable system.

In an embodiment, objects 302 may be one or more VMs $235_1$-$235_N$ and/or one or more software components of VMs $235_1$-$235_N$ and/or of computing devices 100 (both shown in FIG. 2). For example, an object 302 may be a database, a datastore or other storage module, a print server, or a software application or service executing and/or stored within a computing device 100. Alternatively, objects 302 may include any software or physical component, program module, or device that enables system 300 to function as described herein. While three objects 302 are illustrated in FIG. 3, it should be recognized that system 300 may include any suitable number of objects 302. As used herein, the term "module" is used interchangeably with "program module," and refers to a software agent or program that includes a plurality of instructions that, when executed by a processor, perform the functions described herein.

In an embodiment, each object 302 is coupled to monitoring module 304. Monitoring module 304 may be positioned in a separate device or system from one or more objects 302, such as a separate computing device 100. Alternatively, monitoring module 304 may be positioned in the same system or device as one or more objects 302. Monitoring module 304 monitors a status of each object 302. More specifically, monitoring module 304 receives, from objects 302, data and/or signals 310 (hereinafter referred to as "object health data 310") representative of one or more characteristics related to a health determination of each object 302. Such characteristics may include, for example, a utilization amount of an object resource such as memory or a processor, a communication latency with respect to object 302, a network connectivity of object 302, and/or any other suitable characteristic. Monitoring module 304 may receive the object health data 310 periodically or upon the occurrence of an event, such as upon receiving a command to measure the health of object 302. In an embodiment, monitoring module 304 is an application 270 executing on VMs $235_1$-$235_N$ (both shown in FIG. 2). For example, monitoring module 304 may be a part of, or implemented by, a software application suite such as VMware VCenter Operations or VMware AppSpeed, both of which are available from VMware, Inc.

Monitoring module converts the object health data 310 into a numerical value 312 (hereinafter referred to as a "health value 312"). In an embodiment, the health value 312 for each object 302 is a number between 0 and 1. Alternatively, the health value 312 may be any value within any range that enables system 300 to function as described herein. In an embodiment, health values 312 represent an increasing amount of object functionality as the value increases. Accordingly, a health value 312 of 0 represents an object 302 that is non-operational, and a health value 312 of 1 represents an object 302 that is fully functional and/or that is operating at a peak performance. Monitoring module 304 may store the health values 312 in a memory (not shown), and module 304 transmits the health values 312 to optimization module 306. In addition, as described more fully herein, monitoring system 300 may implement one or more actions 314 on objects 302 to adjust a performance of objects 302 and system 300. Alternatively, a separate module (not shown) may implement one or more actions 314 on objects 302.

In an embodiment, monitoring module 304 also monitors one or more consequences 316 of each action 314 selected by optimization module 306 and implemented within system 300. Each consequence 316 represents the expected health value 312 for an object 302 after the action 314 has been implemented. Data representative of the action consequences 316 is transmitted to optimization module 306 for use in determining future actions 314 to implement on objects 302 and/or system 300. In addition, other suitable data, such as data representative of the operating environment of system 300 (hereinafter referred to as "environmental data 318"), is transmitted to optimization module 306 for use in determining one or more actions 314 to implement on objects 302 and/or system 300.

Optimization module 306 receives health values 312 from monitoring module 304 and receives user input data 320 from user interface 308. Additionally or alternatively, optimization module 306 may receive health values 312 from any suitable health model or system that enables system 300 to function as described herein. Optimization module 306 determines an optimal action 314 that will increase or maximize a utility of system 300 based on the health values 312 and based on the user input data 320. Data representative of the optimal action identified or selected by optimization module 306 (hereinafter referred to as the "selected or optimal action 314") is transmitted to monitoring module 304 for implementing on associated objects 302.

User interface 308 includes, without limitation, a keyboard, a pointing device, a mouse, a stylus, a touch sensitive panel (e.g., a touch pad or a touch screen), a gyroscope, an accelerometer, a position detector, and/or an audio input device. User interface 308 transmits data representative of a user input or selection (i.e., user input data 320) to optimization module 306. In one embodiment, user interface 308 is user input device 110 (shown in FIG. 1). In another embodiment, user interface 308 includes network communication interface 112 (shown in FIG. 1) or any other interface instead of, or in addition to, user input device 110. In addition, data may be input into system 300 using network communication interface 112 or any other interface. The data input into system 300, including the data input into user interface 308, may originate from a source other than a user, such as another device or system external to system 300, another component or device within system 300, or any other source that enables system 300 to function as described herein.

In an embodiment, objects 302, monitoring module 304, optimization module 306, and/or user interface 308 are implemented or executed by one or more processors, such as processor 102 and/or processor 245. Data and/or instructions associated with objects 302, monitoring module 304, optimization module 306, and/or user interface 308 are stored in one or more memories, such as memory 104 and/or memory 250. Alternatively, objects 302, monitoring module 304, optimization module 306, and/or user interface 308 may include one or more processors and/or memory to perform the functions described herein.

Referring to FIG. 4, in an embodiment, optimization module 306 includes a database 400 for storing data used to determine an optimal action 314 to implement within system 300. Database 400 includes a list of objects 302, the health value 312 of each object 302, a list of available actions 314 that may be implemented on each object 302, a list of expected consequences 316 for each action 314, environmental data 318 associated with each object 302, an importance value 402 assigned to each object 302, an expected probability 404 of the occurrence of each consequence 316 (hereinafter referred to as an "expected consequence probability 404") upon the implementation of the associated action 314, and a desired utility 406 of system 300.

During operation, a user inputs the desired utility 406 into user interface 308. More specifically, the user inputs the desired performance goal or metric to be optimized within system 300, for example, by optimization module 306. In an embodiment, the desired utility 406 is input or set to be optimizing or increasing the combined health of objects 302 within system 300. Accordingly, the user inputs data into user interface 308 indicating that the objective of optimization module 306 is to optimize or maximize the combined health of objects 302 within system 300. The desired utility 406 is stored in database 400.

The user also inputs importance values 402 into database 400, via user interface 308, indicating a relative importance or weighting of each object 302. The importance values 402 are numerical values that are multiplied by the health values 312 of associated objects 302 to determine the object's 302 effect on the overall health of system 300. In an embodiment, the overall or net health of system 300 is equal to the sum of the importance value 402 of each object 302 multiplied by the health value 312 of object 302. The importance values 402 may be input using a utility function, or any other function or mechanism.

In one embodiment, the user may also input into database 400 an initial (or revised) list of available actions 314 that monitoring module 304 is able or authorized to implement on each object 302 and/or within system 300, and a list of associated consequences 316 for each action 314. It should be recognized that each object 302 and/or system 300 may have any number of associated actions 314 and/or consequences 316 that enables system 300 to function as described herein. In addition, the user may input expected consequence probabilities 404 (also known as "prior probabilities") indicative of an expected probability that an identified consequence 316 will occur when an associated action 314 is implemented. Alternatively, the desired utility 406, importance values 402, available actions 314, consequences 316, and/or expected consequence probabilities 404 may be received from any other module and/or device, and/or may be preloaded or stored within database 400 before optimization module 306 is executed or at any suitable time.

In an embodiment, environmental data 318 for each object 302 is transmitted to database 400 from monitoring module 304. Environmental data 318 may include an object state (i.e., current or historical values of parameters and/or variables associated with object 302), current or historical values of parameters and/or variables associated with other objects 302 and/or system 300, and/or any other suitable data that enables system 300 and optimization module 306 to function as described herein. After all desired values or inputs have been received from user via user interface 308, optimization module 306 is initiated (or re-initiated if already executing). As described herein, optimization module 306 determines or selects the action 314 (hereinafter referred to as the "optimal action") that is expected to maximize the utility 406 (e.g., the health) of system 300 as a whole.

Optimization module 306 determines an expected utility or effect on the health of system 300 for each available action 314 in database 400. More specifically, optimization module 306 selects, for example, the first available action 314 and identifies each expected consequence 316 that may occur if the first available action 314 is implemented. Optimization module 306 calculates an expected utility of each consequence 316 by multiplying an expected change in the health value 312 and the importance value 402 of the object 302 affected.

For example, a first object 302, such as a central database, may have an importance value 402 of 1000, as input or set by the user. If the central database is non-operational, the health value 312 of the central database may be determined to be equal to 0. A second object 302, such as a print server, may have an importance value of 10. If the print server is fully operational, the health value 312 of the print server may be determined to be equal to 1. The first available action 314 may represent, for example, rebooting a server that hosts the central database and the print server. Optimization module 306 may determine that the first available action 314 (selected from database 400) may result in two consequences 316, or any other number of consequences 316. The first consequence 316 may be that the health value 312 of the first object 302 (i.e., the central database) may become 1 (i.e., rebooting the server causes the central database to become fully operational). The second consequence 316 may be that the health value 312 of the second object 302 (i.e., the print server) may become 0 (i.e., rebooting the server causes the print server to crash or become non-operational).

Optimization module 306 calculates the expected utility of the first consequence 316 (i.e., the health value 312 of the central database becomes 1) by multiplying the change in the health value 312 of the first object 302 by the importance value 402 of the first object 302. In the example provided, the change in the health value 312 of the first object 302 is obtained by subtracting the current health value 312 (i.e., 0) from the expected health value 312 (i.e., 1), which yields a value of 1 (i.e., 1−0=1). The change in health value (i.e., 1) is multiplied by the importance value 402 of the first object 302 (i.e., 1000) to obtain the expected utility of the first consequence 316 (i.e., 1*1000=1000).

In addition, the expected utility of the first consequence 316 is multiplied by the expected probability 404 of the occurrence of the first consequence 316. For example, if it is expected that implementing the first action 314 will cause the health value 312 of the central database to change to 1 with a 50% probability (i.e., the expected probability 404 of first consequence 316 is 50% or 0.5), the expected utility of the first consequence 316 is multiplied by 0.5 to obtain an effective utility of the first consequence 316. In the example provided, the effective utility of the first consequence 316 is equal to the expected utility (1000) multiplied by the expected probability (0.5) to obtain a value of 500.

The expected utility of the second consequence 316 (i.e., the health value 312 of the print server becomes 0) is obtained by multiplying the change in the health value 312 of the second object 302 by the importance value 402 of the second object 302. In the example provided, the change in the health value 312 of the second object 302 is obtained by subtracting the current health value 312 (i.e., 1) from the expected health value 312 (i.e., 0), which yields a value of negative 1 (i.e., 0−1=−1). The change in health value (i.e., −1) is multiplied by the importance value 402 of the second object 302 (i.e., 10) to obtain the expected utility of the second consequence 316 (i.e., −1*10=−10). Because the expected utility of the second consequence 316 is a negative value, it may be referred to as a "disutility" or a "friction cost" associated with the implementation of the first action 314.

In a similar manner, the expected utility of the second consequence 316 is multiplied by the expected probability 404 of the occurrence of the second consequence 316. For example, if it is expected that implementing the first action 314 will cause the health value 312 of the print server to change to 0 with a 90% probability (i.e., the expected probability 404 of second consequence 316 is 90% or 0.9), the expected utility of the second consequence 316 is multiplied by 0.9 to obtain an effective utility of the second consequence 316. In the example provided, the effective utility of the second consequence 316 is equal to the expected utility (−10) multiplied by the expected probability (0.9) to obtain a value of negative 9.

Optimization module 306 then calculates the expected utility of each action 314 by summing the effective utility of each consequence 316 associated with the action 314. The expected utility of each action 314 represents the increase (or decrease) in system 300 utility expected to be caused by the implementation of the action 314. In the example provided, the expected utility of the first action 314 is equal to the effective utility of the first consequence 316 (500) plus the effective utility of the second consequence 316 (−9), which yields an expected utility of 491 for the first action 314. It should be recognized that the expected utility of each action 314 represents the effect on the utility of system 300 as a whole, since the calculation of the expected utility of each action 314 incorporates the effect (or consequence 316) of the action 314 on each other object 302 in system 300.

Optimization module 306 may also calculate an expected utility of doing nothing as an action 314. In an embodiment, the expected utility of doing nothing may be 0, or may be any other number. For example, in one embodiment, an action 314 of doing nothing may have a non-zero probability of changing a health value 312 of an object 302 such that the expected utility of one or more consequences 316 (and therefore of action 314) may be non-zero. In such an embodiment, the expected utility of doing nothing is calculated in a similar manner as the expected utility of any other action 314.

Optimization module 306 calculates the expected utility of each other available action 314 in a similar manner as described above and compares the expected utility values of each action 314. Optimization module 306 selects the optimal action 314 to be the action 314 that has the highest expected utility with respect to the system 300 as a whole (i.e., with respect to the cumulative or net effect of the action 314 on each affected object 302 within system 300). Optimization module 306 transmits the optimal action 314 to monitoring module 304 to be implemented within system 300. In another embodiment, optimization module 306 selects the optimal action 314 to be the action 314 that has the second-highest expected utility with respect to the system 300 as a whole, or any other action 314 based on the expected utility of the system 300.

Monitoring module 304 implements the optimal action 314 on one or more objects 302 and/or within system 300, and measures and/or monitors the actual consequences 316 that occur on objects 302 and/or system 300. Monitoring module 304 transmits data representative of the actual consequences 316 to optimization module 306 to enable optimization module 306 to refine or adjust the expected probability 404 of one or more consequences 316. For example, if the action 314 taken was to reboot the server hosting the central database and the print server, monitoring module 304 measures and/or monitors the actual consequence 316, or change in health value 312, with respect to the central database and the print server. Optimization module 306 stores data representative of the actual consequences 316 of each action 314 within database 400 and/or within any other memory after each action 314 is implemented.

In an embodiment, the expected probabilities of consequences 316 are updated, based on the actual consequence 316 data, using a Bayesian updating function or equation, such as the following Equation 1:

$$lP(H|E) = lP(H) + \log(P(E|H)) - \log(P(E|\text{not} H))$$ Equation 1 where l is the logit function: logit(p)=log(p/[1−p]). The inverse of the logit function is the expit function: expit(p)=1/(1+2^p), assuming a base of 2 for the logarithm function. H represents the hypothesis that the consequence 316 is accurate (i.e., that action 314 results in consequence 316 with a probability that is equal to the expected probability 404). E represents the evidence, or the observed or actual consequence 316 of the action 314 upon an object 302 and/or system 300. The term P(H|E) is the probability of E given H, which corresponds to the expected probability 404 of consequence 316 described above. The term P(H) is the probability of H and represents a belief or measure of confidence in the strength of the hypothesis H. P(E|H) is the probability of E given H, and P(E|not H) is the probability of E given that the hypothesis H is incorrect, and may include the probability that an object 302 may spontaneously recover from a condition or fix itself (also known as "self-healing").

For example, H may represent the hypothesis that rebooting a server fixes an error in which the server is unresponsive, or "locked up," with a probability of 0.9. The initial probability of the hypothesis H (i.e., P(H)) being true may be 0.8, for example. An action 314 may be taken to reboot the server, and the consequence 316 may be that the server is no longer locked up (i.e., the observed evidence E indicates that the health value 312 of the server changed to 1). To verify that the hypothesis H is correct, i.e., that rebooting the server fixed the locked up condition rather than the alternative situation in which another event or action fixed the condition, optimization module 306 uses Equation 1 to obtain the probability that the hypothesis H is correct given the evidence E observed.

In the example provided, lP(H) equals logit(0.8), which results in a value of 2 (log(0.8/0.2)) using a base 2 logarithm. P(E|H) is 0.9 in the example provided, and log(P(E|H)) is equal to about negative 0.15. P(E|not H) may be, for example, 0.01 to represent a small, non-zero probability that the locked up condition was fixed by itself, rather than by implementing the action 314. The value of log(P(E|H)) is equal to about negative 6.65 in this example. Accordingly, lP(H|E) is equal to 2+(−0.15)−(−6.65), which is equal to 8.5. To obtain the probability of hypothesis H being true after observing the evidence E (i.e., the actual consequence 316 of action 314), optimization module 306 calculates expit(8.5), yielding a value of about 0.997. Optimization module 306 thus may determine that the expected probability 404 of consequence 316 stored in database 400 that was used to determine the optimal action 314 has a probability of about 99.7% of being accurate.

In addition, optimization module 306 uses Bayesian scoring to validate the probabilities and/or other assumptions used in Equation 1. More specifically, optimization module 306 calculates a penalty for each expected probability 404 of each consequence 316 that occurs. In an embodiment, each penalty is equal to the base 2 logarithm of the expected probability 404. Optimization module 306 validates the expected probability 404 of each consequence 316 associated with the implemented (optimal) action 314 using the calculated penalty. More specifically, if the penalty is greater than an expected penalty, optimization module 306 determines that one or more probabilities or assumptions used by the Bayesian updating function are incorrect. Optimization module 306 may then adjust the Bayesian updating function, for example, by adjusting one or more probabilities and/or assumptions (e.g., the probability of an object 302 such as the server fixing itself, or "self-healing") used in Equation 1, and may recalculate the penalties based on the adjusted probabilities and/or assumptions. Optimization module 306 adjusts the probabilities and/or assumptions to minimize the penalties.

In an embodiment, the probability estimations used by optimization module 306 and/or by Equation 1 are stored within optimization module 306 in logit format to reduce or eliminate numerical underflow or overflow errors when a probability is close to 0 or to 1. In addition, a probability of 0 may be stored or approximated as lP=negative 1000 to avoid an error that may result by attempting to perform a Bayesian update with a probability of 0. A probability of 1 may be stored or approximated as lP=1000 to avoid an error that may result by attempting to perform a Bayesian update with a probability of 1.

As described herein, the optimization module 306 provides a robust self-learning algorithm to determine an optimal action 314 to implement to maximize the utility, or health, of system 300. Initial probabilities of expected consequences 316 are updated based on actual consequences 316 measured by monitoring module 304.

FIG. 5 is a flow diagram of an exemplary method 500 of optimizing or increasing a utility of a system, such as system 300 (shown in FIG. 2). In an embodiment, method 500 is at least partially executed by a computing device 100 (shown in FIG. 1) and/or a VM $235_1$ (shown in FIG. 2). For example, a plurality of computer-executable instructions are embodied within a computer-readable medium, such as memory 104 or memory 250. The instructions, when executed by a processor, such as processor 102 or processor 245, cause the processor to execute the steps of method 500 and/or to function as described herein. Alternatively, method 500 may be executed by any other processor and/or may be stored in any other memory that enables system 300 and method 500 to function as described herein.

In an embodiment, method 500 includes receiving 502 a health determination of each of a plurality of objects, such as objects 302, of the system 300. The health determination includes the health values 312 of objects 302 received from monitoring module 304 (all shown in FIG. 3). A plurality of available actions 314 are identified 504, wherein each action 314 is associated with at least one expected consequence 316 (both shown in FIG. 4). For example, the plurality of actions 314 may be received from database 400 (shown in FIG. 4) after being input by a user through user interface 308 (shown in FIG. 3).

An effective utility of each consequence 316 is determined 506 for each action 314. More specifically, an expected utility of each consequence 316 is initially determined by multiplying an expected change in the health value 312 of object 302 associated with consequence 316 and the importance value 402 (shown in FIG. 4) of object 302. The effective utility of each consequence 316 is obtained by multiplying the expected utility of consequence 316 and the expected probability 404 (shown in FIG. 4) of consequence 316.

An expected utility of each action 314 is determined 508 based on each consequence 316. More specifically, the expected utility of each action 314 is determined 508 by summing the effective utility of each consequence 316 associated with action 314. An action 314 that has a highest expected utility for the system 300 is selected 510 from the plurality of available actions 314. The highest expected utility for the system 300 is achieved by considering the effect or consequence 316 of each action 314 on each affected object 302 within system 300 and selecting the action 314 that has the highest net utility for system 300.

The selected action 314 is implemented 512 within system 300, for example, by monitoring module 304. After the selected action 314 has been implemented 512, the actual consequences 316 of action 314 are determined 514, for example, by monitoring module 304. One or more expected probabilities 404 are updated 516 based on the actual consequences 316 using a Bayesian updating function, such as Equation 1 described above with reference to FIG. 4. In addition, one or more probabilities are validated 518 using Bayesian scoring.

Exemplary Operating Environment

The system and modules as described herein may be performed by one or more computers or computing devices. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for optimizing performance of software applications or other objects, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein.

For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a plurality of virtual machines (VMs) executing on at least one host;
    a monitoring module coupled to the VMs and configured to determine a net health of the system using importance values and a health values value associated with each available VM, an importance value representative of an importance of a respective available VM and health value representative of an expected performance level for the respective available VM; and
    an optimization module coupled to the monitoring module, the optimization module configured to:
    receive a user input indicating a utility to be increased within the system, wherein the utility is based on the net health of the available VMs;
    receive the importance values and the health values associated with each of the available VMs, wherein the importance values indicate a weighting to be applied to respective health values
    identify a plurality of available actions to be performed on each of the available VMs, wherein each available action is associated with at least one expected consequence;
    calculate an expected utility of each action based on an expected net health of the system upon executing each action by summing each effect of the expected consequence has on the available VMs, wherein each of the effects is calculated by multiplying an expected change in health value for an effected VM with an importance value for the effected VM and with a probability of an occurrence of the at least one expected consequence;
    calculate an effective utility of each action by summing the expected utility of each action; and
    select, using respective effective utilities for the plurality of available actions, an action based on the highest expected utility for the system,
    implement, by the monitoring module, the selected action upon the plurality of VMs and the system, wherein the implementation of the selected action further comprises:
    adjusting performance of the plurality of VMs and the system and validating the probability of the occurrence of the at least one expected consequence.

2. The system of claim 1, wherein the optimization module is configured to:
    select, from the plurality of available actions, an action that has a highest expected utility for the system;
    send the selected action to the monitoring module for execution;
    receive an actual consequence for the executed selected action; and
    update the expected probability of the expected consequence based on the actual consequence.

3. The system of claim 1, wherein the monitoring module implements the selected action within the system and determines an actual consequence of the implemented action.

4. The system of claim 3, wherein the optimization module updates the probability of the expected consequence that is associated with the implemented action based on the actual consequence.

5. The system of claim 4, wherein the optimization module updates the probability of the expected consequence that is associated with the implemented action using a Bayesian updating function based on the actual consequence.

6. The system of claim 4, wherein the optimization module validates the probability of the expected consequence that is associated with the implemented action using Bayesian scoring.

7. A method of increasing a utility of a system, the method comprising:
    determining, by a monitoring module, a net health of a system using importance values and a health value associated with each available object, and an importance value representative of an importance of a respective available object;
    receiving, by an optimization module, the health value of the plurality of available objects within the system, the health value representative of an expected performance level for each of the available objects;
    receiving importance values associated with each available object, wherein the importance values indicate a weighting to be applied to the respective health values;
    identifying a plurality of available actions to be implemented on the available objects, wherein each of the plurality of available actions is associated with at least one expected consequence;
    calculating an expected utility for at each of the plurality of available actions based on an expected net health of the system upon execution of each of the plurality of available actions, the net health of the system based on a net effect of each expected consequence for the plurality of available objects, an effect being calculated by multiplying an expected change in the health value of an available object with an importance value of the available object and with a probability of an occurrence of the at least one expected consequence;
    calculate an effective utility of each of the plurality of available actions by summing the expected utility of each of the plurality of available actions; and
    selecting, from using respective effective utilities for the plurality of available actions, an action based on the highest expected utility for the system,
    implement, by the monitoring module, the selected action upon the plurality of objects and the system, wherein the implementation of the selected action further comprises:
    adjusting performance of the plurality of objects and the system and validating the probability of the occurrence of the at least one expected consequence.

8. The method of claim 7, further comprising implementing the selected action within the system and determining an actual consequence of the implemented action.

9. The method of claim 8, further comprising updating the probability of the expected consequence associated with the implemented action using a Bayesian updating function based on the actual consequence.

10. The method of claim 9, further comprising calculating a penalty based on the probability of the expected consequence associated with the implemented action.

11. The method of claim 10, further comprising validating the probability of the expected consequence associated with the implemented action using the calculated penalty.

12. The method of claim 11, wherein validating the probability comprises adjusting the Bayesian updating function if the determined penalty exceeds an expected penalty.

13. One or more non-transitory computer storage media having computer-executable instructions embodied thereon, wherein, when executed by at least one processor, the computer-executable instructions cause the processor to:
- determine a net health of a system using importance values and a health value associated with each available object, and an importance value representative of an importance of a respective available object;
- receive at least one health value associated with the at least one available object within the system, the health value representative of an expected performance level for the available objects;
- receive the at least one importance value associated with the at least one available object, wherein the importance value indicates a weighting to be applied to the health value of the at least one available object;
- identify a plurality of available actions to be implemented within the system, wherein each available action is associated with at least one expected consequence;
- calculate an effective utility of each expected consequence by multiplying an expected change in the health value associated with the at least one available object with the importance value associated with the at least one available object and with a probability of the occurrence of the expected consequence;
- calculate an expected utility of each available action by summing the effective utility of each expected consequence associated with the action; and
- select, from the plurality of available actions, an action based on the highest expected utility for the system, implement the selected action upon the plurality of objects and the system, wherein the implementation of the selected action further comprises:
- adjusting performance of the plurality of objects and the system and validating the probability of the occurrence of the at least one expected consequence.

14. The non-transitory computer storage media of claim 13, wherein the computer executable instructions cause the processor to calculate the effective utility of each expected consequence by multiplying the health value associated with the at least one available object, the importance value associated with the at least one available object, and the probability of the occurrence of the expected consequence.

15. The non-transitory computer storage media of claim 13, wherein the computer-executable instructions further cause the processor to transmit the selected action to a monitoring system to implement the selected action within the system.

16. The non-transitory computer storage media of claim 15, wherein the computer-executable instructions further cause the processor to determine an actual consequence of the implemented action.

17. The non-transitory computer storage media of claim 16, wherein the computer-executable instructions further cause the processor to update the probability of an expected consequence associated with the implemented action based on the actual consequence.

18. The non-transitory computer storage media of claim 16, wherein the computer-executable instructions further cause the processor to update the probability of an expected consequence based on the actual consequence using a Bayesian updating function.

19. The non-transitory computer storage media of claim 13, wherein the computer-executable instructions further cause the processor to validate the probability of an expected consequence using Bayesian scoring.

\* \* \* \* \*